(12) United States Patent
Schexnaider

(10) Patent No.: US 11,479,325 B1
(45) Date of Patent: Oct. 25, 2022

(54) SERRATED KEEL

(71) Applicant: Neil Schexnaider, Rayne, LA (US)

(72) Inventor: Neil Schexnaider, Rayne, LA (US)

(\*) Notice: Subject to any disclaimer, the term of this patent is extended or adjusted under 35 U.S.C. 154(b) by 202 days.

(21) Appl. No.: 16/793,207

(22) Filed: Feb. 18, 2020

Related U.S. Application Data

(60) Provisional application No. 62/807,529, filed on Feb. 19, 2019.

(51) Int. Cl.
*B63B 3/38* (2006.01)
*B63B 3/10* (2006.01)

(52) U.S. Cl.
CPC . *B63B 3/38* (2013.01); *B63B 3/10* (2013.01)

(58) Field of Classification Search
CPC .... B63B 3/38; B63B 3/10; B63B 1/20; B63B 2001/202
See application file for complete search history.

(56) References Cited

U.S. PATENT DOCUMENTS

| | | | |
|---|---|---|---|
| 1,933,598 A | 11/1933 | Parker | |
| 2,446,860 A * | 8/1948 | Wallace | B63B 3/38 114/67 A |
| 3,162,167 A | 12/1964 | Wynne | |
| 3,316,874 A * | 5/1967 | Canazzi | B63B 1/38 114/67 A |
| 4,348,195 A | 9/1982 | Lantz | |
| 4,528,931 A * | 7/1985 | Lantz | B63B 1/04 114/291 |
| 4,708,085 A | 11/1987 | Blee | |
| 5,031,556 A | 7/1991 | Blee | |
| 6,634,309 B2 | 10/2003 | Radrizzani | |
| 7,845,301 B2 * | 12/2010 | Loui | B63B 1/34 114/284 |
| 8,291,850 B1 | 10/2012 | Peters | |
| 9,038,561 B2 | 5/2015 | Loui et al. | |
| 2011/0297069 A1 | 12/2011 | Quimby | |
| 2016/0129970 A1* | 5/2016 | Bjersten | B63B 1/042 114/271 |

\* cited by examiner

*Primary Examiner* — Anthony D Wiest
(74) *Attorney, Agent, or Firm* — Garvey, Smith & Nehrbass, Patent Attorneys, L.L.C.; Seth M. Nehrbass; Fabian M. Nehrbass

(57) ABSTRACT

A boat hull includes a serrated keel which is utilized to dissipate local energy and increase efficiency by reducing drag. In one embodiment, the boat hull preferably includes serrations which are teardrop shaped with a ratio of 3 to 1 in that the length of the teardrop cutout is 3 times the depth.

13 Claims, 18 Drawing Sheets

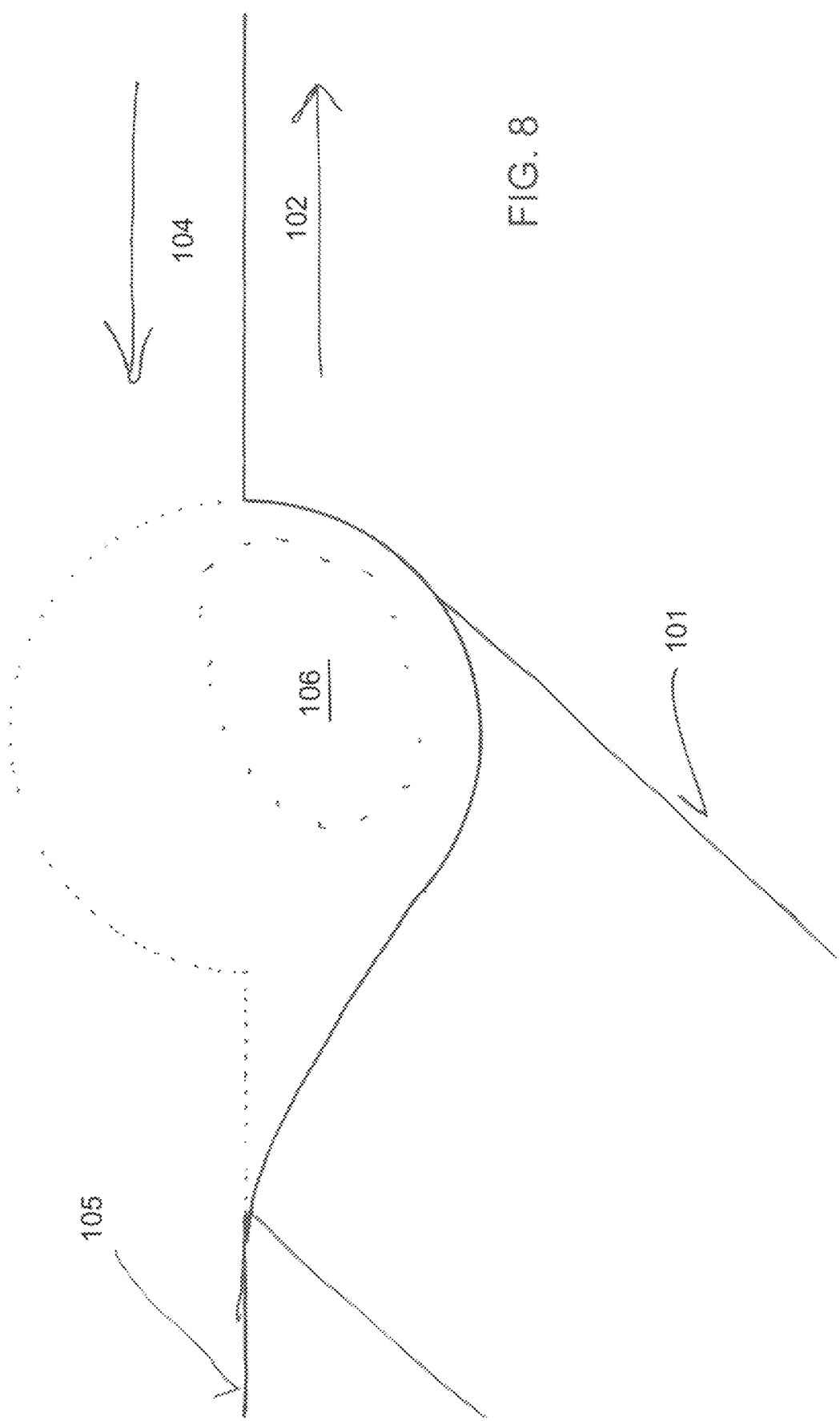

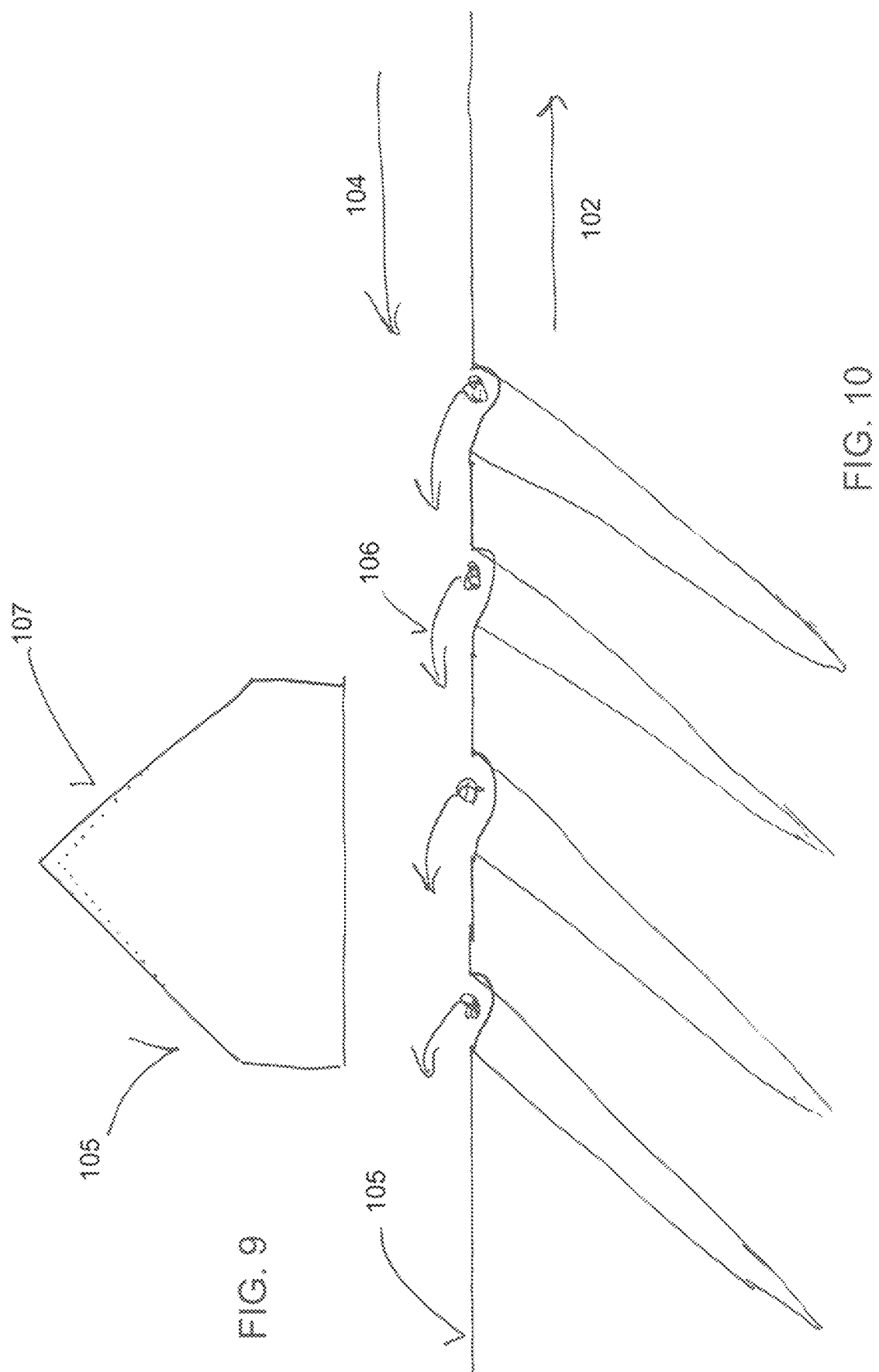

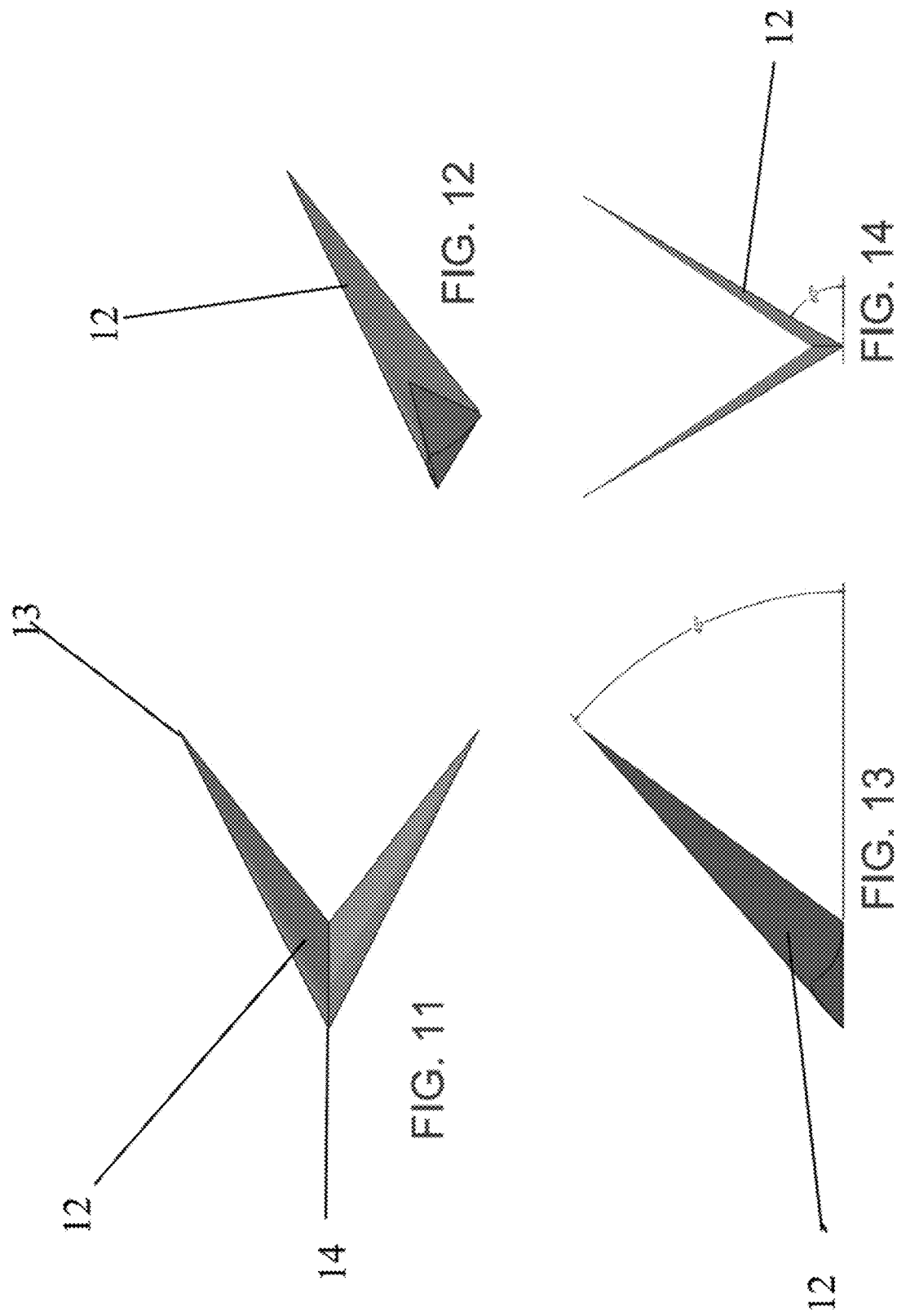

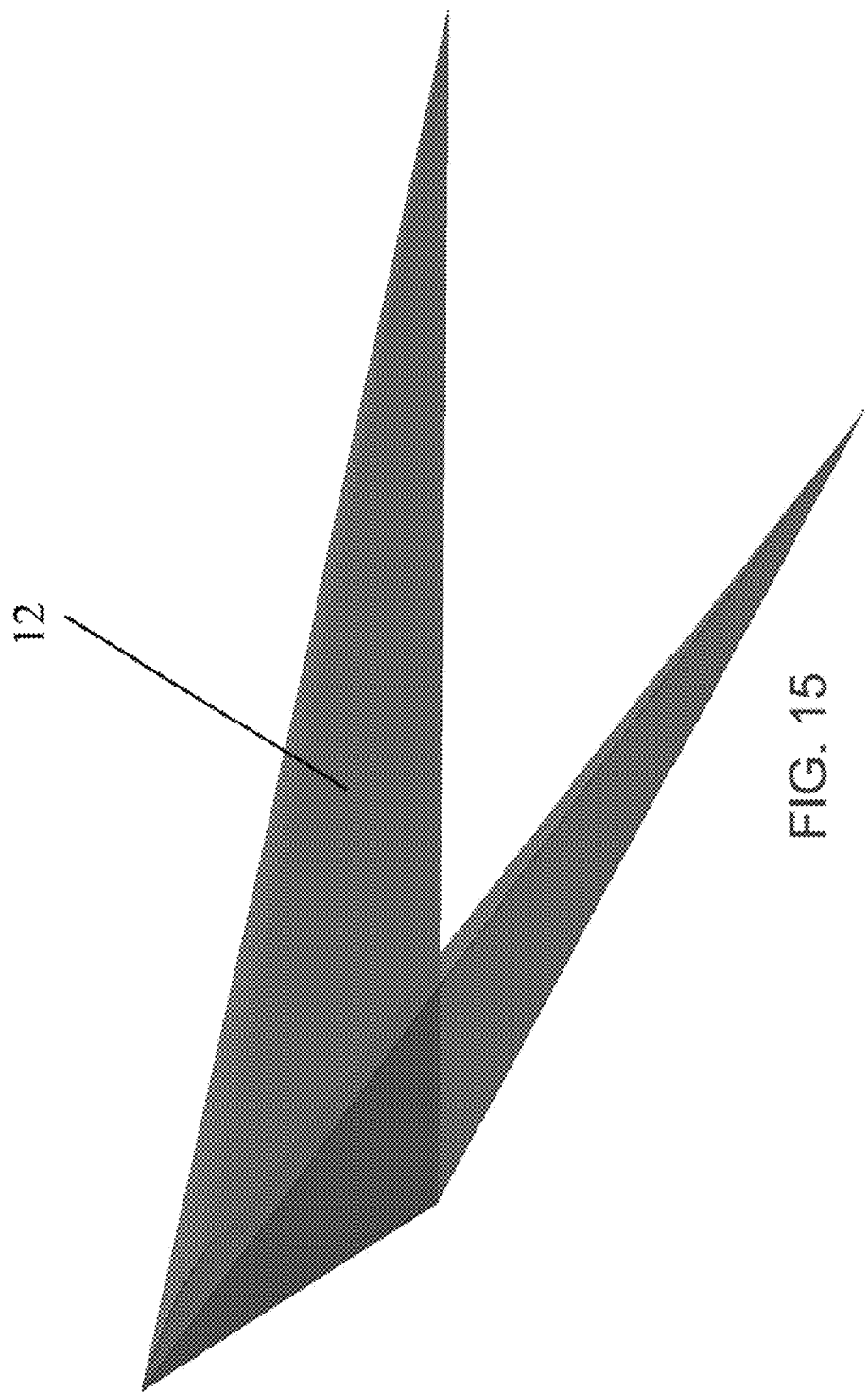

SERRATED KEEL

CROSS-REFERENCE TO RELATED APPLICATIONS

Priority of U.S. Provisional Patent Application Ser. No. 62/807,529, filed 19 Feb. 2019, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to boat hulls. More particularly, the present invention relates to a serrated keel which is able to dissipate local energy and increase efficiency by reducing drag.

2. General Background of the Invention

As to the how the disclosed invention differs from earlier attempts to solve the same problem, this invention focuses on the keel of the vessel whereas previous methods were to modify the flat portions of the hull. More specifically, this invention focuses on the keel of the vessel with extensions into the nearby areas, whereas the lifting strakes focus only on the flat portions of the hull and the stepped hull breaks up the bottom into multiple multilevel sections from keel to gunwale.

The commercial competitive advantages of the invention are the potential to increase hull efficiency with corresponding reduction in fuel costs. Reduction in impact stresses to hull and any associated equipment.

The primary purpose of a serrated keel is to dissipate local energy generated when a boat hull is subjected to vertical and/or longitudinal impact on the surface of the water while the craft is cruising at or above planing speed.

A secondary purpose of a serrated keel is to increase efficiency along the aft section of the keel by reducing parasitic drag and allowing space for the introduction of air into the gap between the hull and the surface of the water while the craft is cruising at or above planing speed.

As the boat hull speeds through the water, the contact area of the hull decreases as the hull velocity increases. In the case of V bottom planing monohulls, the focal point of hull/water contact is typically towards the rear 25% of the boat. As speed increases the contact area may decrease to 10% or less. The pressure exerted on the hull at speed is localized along the rearward section of the keel. The water surface/keel contact area reaches a point of stability where the weight of the boat and the pressure exerted on the water surface is equalized. At this balance point, the highest pressure is focused at the center of the hull, where it has penetrated deepest into the water column. This contact point near the rear center of the hull is hereby referred to as the "pad" and many hull manufacturers attempt to design this running area to maximize control of the vessel by offering a smooth V shaped area for the hull to take impacts and disperse this energy out to the sides of the hull. In a V shaped hull, the deadrise or angle of dihedral is very important as it attributes to lowering drag and increasing stability as the center of the keel rests lower than the sides thus offering a lower center of gravity in the area. As the hull skims along the surface of the water, the first contact point of the keel or section of the keel to the last contact point forms a line from the front to the rear of the hull. The pressure exerted from the hull/water contact is focused down the length of this line and outward from the keel, as the hull travels over the surface of the water, the pressure decreases as the water travels laterally away from the centerline of the hull or has exited the rear of the hull.

At least two major improvements have been made to hull design: Other methods may exist beyond these two examples.

1. Lifting Strakes (Wynne James R.—U.S. Pat. No. 3,162,167)
2. Stepped Hull (Michael Paul Peters—U.S. Pat. No. 8,291,850 B 1)

Lifting Strakes:

The addition of longitudinal hull protrusions aid in taking some of the outflow of water laterally exiting the keel and direct some of this energy downward to aid in lifting the hull out of the water when traveling at or above planing speed. They also aid in introducing air between the hull and the water which acts as lubrication to reduce friction.

Stepped Hull:

A step in the hull allows it to be broken up into smaller sections so that the drag associated is minimized along each section and not on the entire length of the hull at any one time. Each step also aids in the introduction of air into the gaps which act as lubrication to reduce friction.

Both of these improvements focus on the flat side portions of the hull and not necessarily the centerline or the keel.

The following U.S. Patent documents are incorporated herein by reference: U.S. Pat. Nos. 1,933,598; 3,162,167; 4,348,195; 4,708,085; 5,031,556; 6,634,309; 7,845,301; 8,291,850; 9,038,561; and U.S. Patent Application Publication No. 2011/0297069.

BRIEF SUMMARY OF THE INVENTION

The apparatus of the present invention includes a serrated keel which is utilized to dissipate local energy and increase efficiency by reducing drag. The serrations can, but need not, be limited to the aft portion of the hull. In the hand drawings submitted with my provisional patent application No. 62/807,529 (filed 19 Feb. 2019), the serrations are shown limited to the aft portion of the hull, because the aft portion of the hull will provide the benefit of the invention while cruising as this area is in contact with the water all the time. This is the part of the invention that should provide greater efficiency. In the computer drawings submitted with my provisional patent application and in the figures submitted with this application (FIGS. 1-4), the serrations are not limited as such, because the forward portion of the hull will aid in impacting waves both head on and at side angles when cruising. Since the bow area is typically held above the waterline, these areas will not aid in efficiency.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 8 is a partial side view diagram of a preferred embodiment of the apparatus of the present invention displaying the low-pressure area, direction of fluid flow, and direction of travel;

FIG. 9 is a partial view of the hull bottom of a preferred embodiment of the apparatus of the present invention;

FIG. 10 is partial side view of a preferred embodiment of the apparatus of the present invention displaying a close-up of a serrated hull located in rear of hull;

FIGS. 11-20 show plugs to be used in molds to produce hulls with serrations;

DETAILED DESCRIPTION OF THE INVENTION

Description of the Invention: A serrated keel offers cushioning or dampening from impacts and includes channels to disperse energy outwards and rearwards along the hull FIGS. 1-4 of my provisional patent application show overall hull bottom with proposed changes to the normally flat or linear surface of the keel.

The present invention can include teardrop hull cutouts. The semi-teardrop shapes induce a low-pressure area behind the initial cutouts when the hull is at speed. This low-pressure area causes interruption to the buildup of parasitic drag along the originally flat surface of the hull bottom. The teardrop hull cutouts also allow increased surface area for the impact force of the hull on the surface of the water to be better dissipated and directed or channeled towards the rear and side of the hull. In this manner the cutouts act as accumulator pockets or dampeners to the hull when the hull impacts the surface of the water while at speed. This function will cushion and smooth the ride and also act to increase efficiency.

In various embodiments, some or all of the teardrop cutouts depart from the centerline in oblique angles. The departure angles and extensions of the teardrop cutouts function as fluid channels to direct water under compression forces away from the impact. The oblique angles towards the rear of the hull direct fluids away from the centerline and allow the compressive forces to dissipate outwards and rearwards. These extensions of the teardrop shapes allow a "follow through" or conduit for the energy concentrated at the center of the hull during impacts to be neatly and evenly distributed outwards and away from the hull. The extensions also serve to break up the surface area which further lends to reduced parasitic drag.

Figure 1:
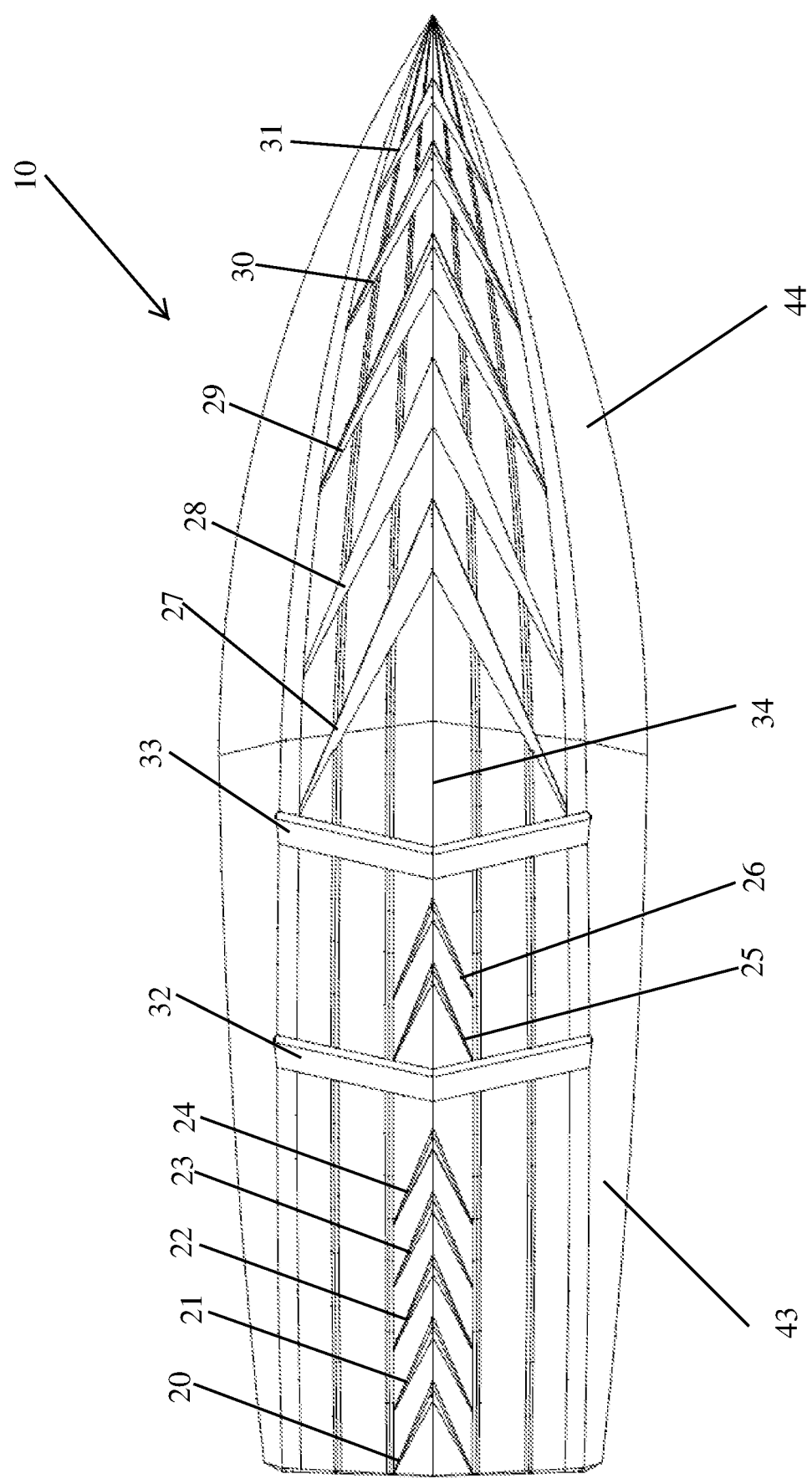
FIG. 1 is a bottom view of a preferred embodiment of the apparatus of the present invention.
Figure 2:
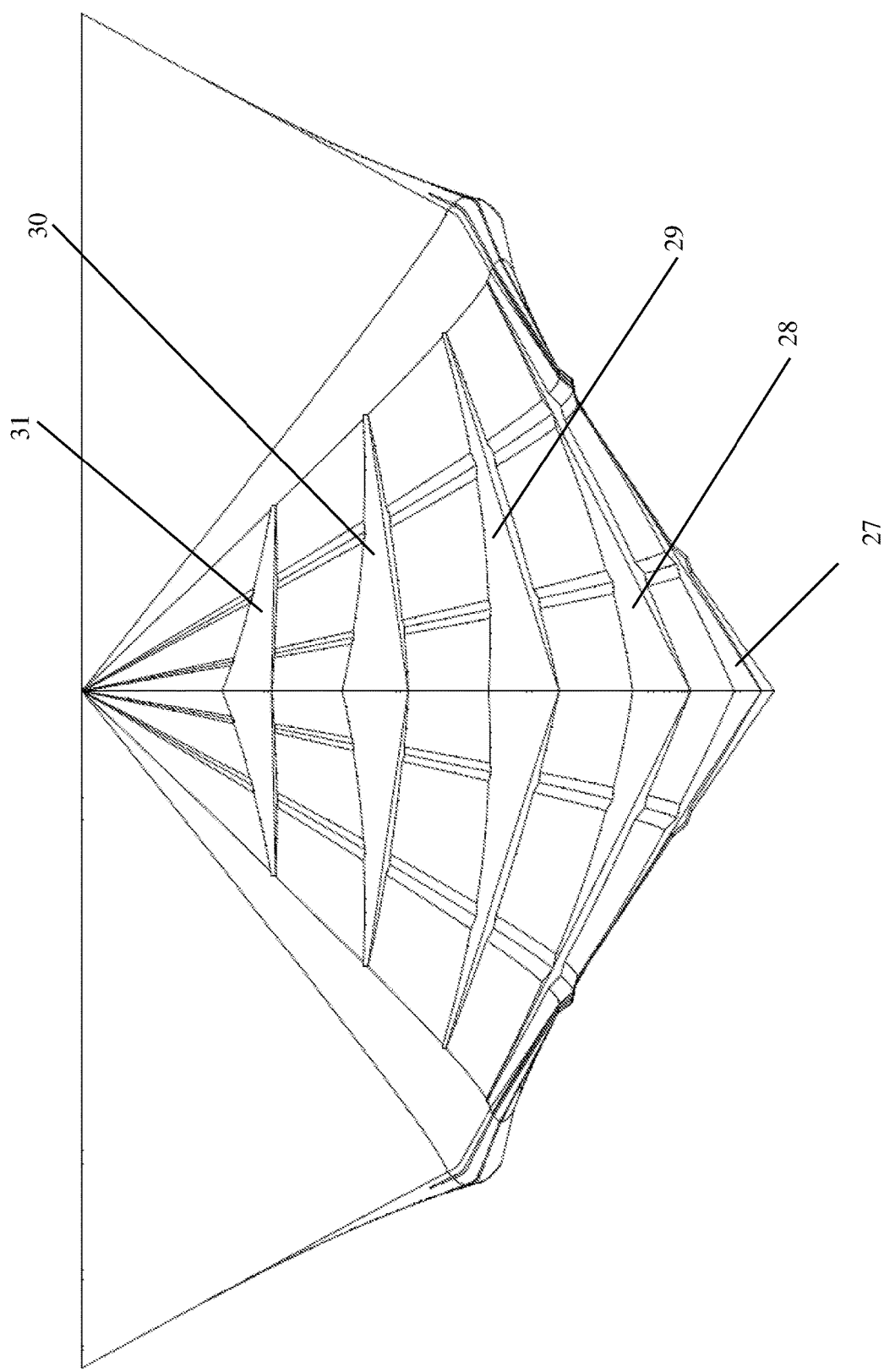
FIG. 2 is front perspective view of a preferred embodiment of the apparatus of the present invention.
Figure 3:
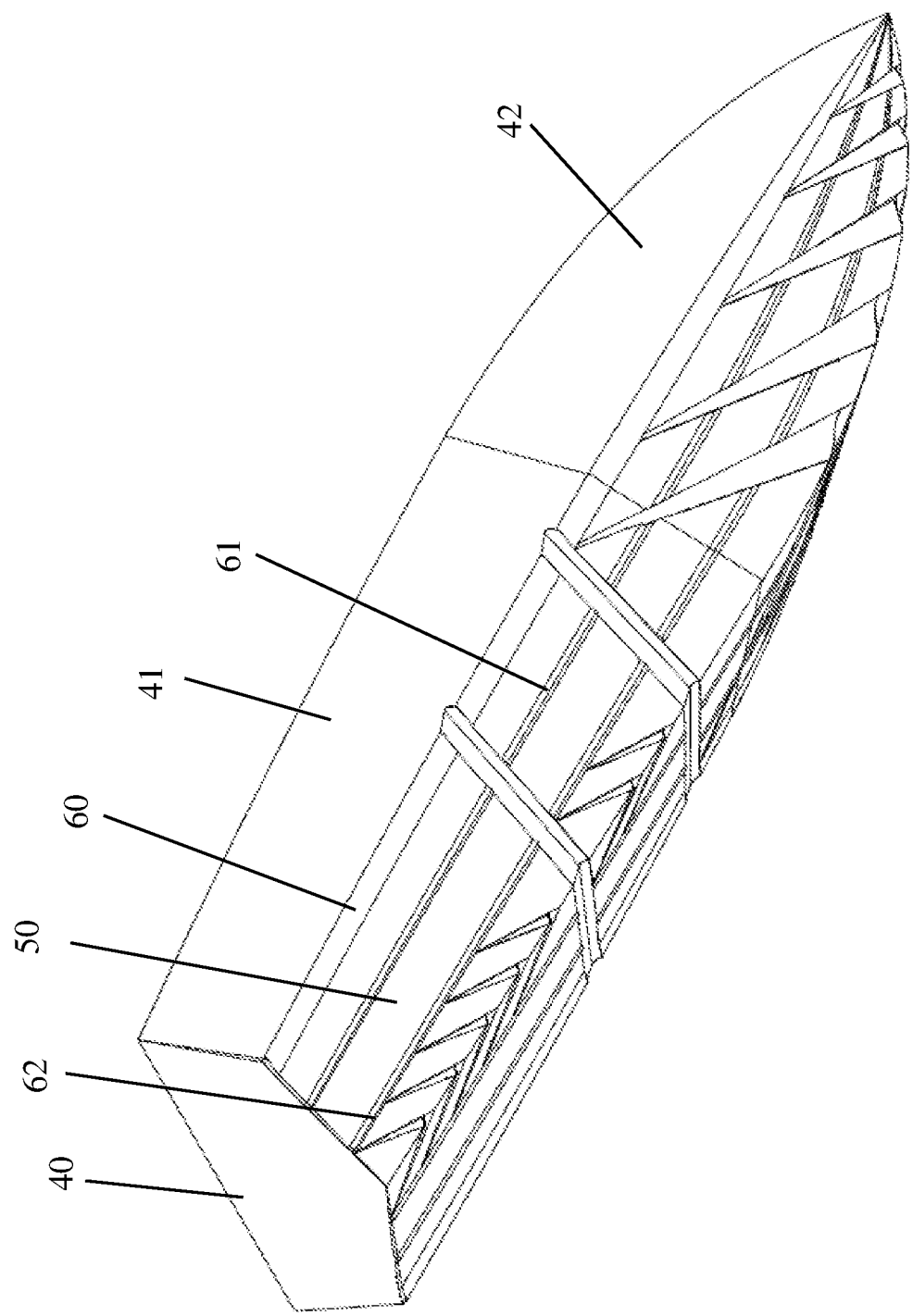
FIG. 3 is a side perspective view of a preferred embodiment of the apparatus of the present invention.
Figure 4:
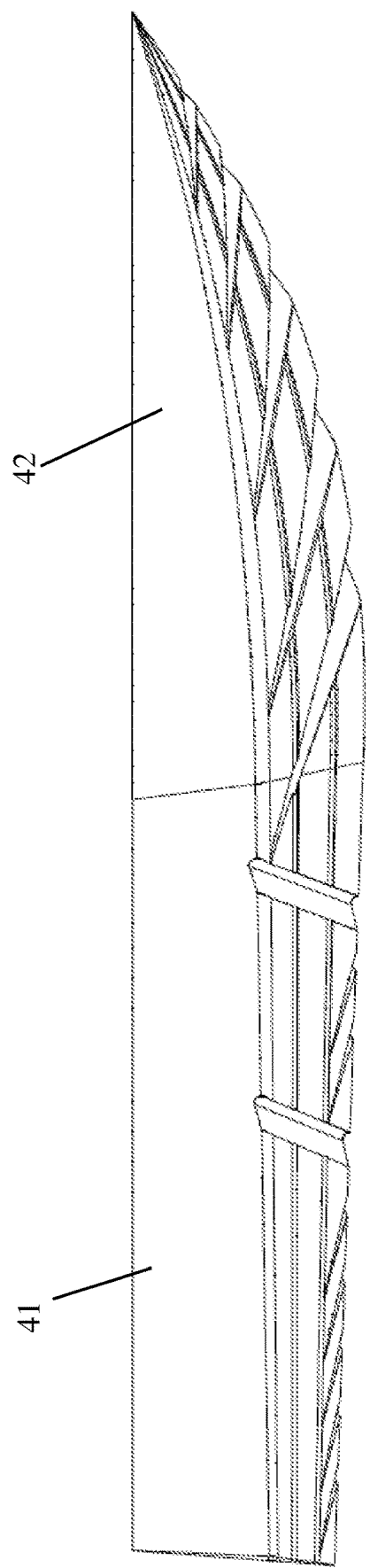
FIG. 4 is a side view of a preferred embodiment of the apparatus of the present invention displaying the low-pressure area, direction of fluid flow, and direction of travel.

As shown in FIG. 1, aft hull serrations 20-26 may be of similar size as the width of the hull panels are similar through the length. As shown in FIG. 1, the forward hull serrations may get smaller from aft to forward as the bow gets narrower.

As shown in FIG. 1, for example, the serrated keel comprises at least two serrations 20, 21, said serrations being generally V-shaped when viewed from below the hull, wherein each serration has a starboard portion and a port portion, a fore end and an aft end, said starboard and port portions meeting at the centerline of the hull and each extending from the centerline of the hull rearwardly and away from the centerline of the hull.

Additional support and further expansion or definition in detail of the concepts related to the present invention is set forth below:

1. Pad Area

The area in which the hull maintains lift and stability while cruising may have serrations. Furthermore, the bow area which takes the brunt of the impact may have more aggressive serrations including the panel area pockets in which to provide shock absorption when impacting waves.

2. Interface Between Air and Water

When discussing movement of a vehicle through air, many forces and parameters are applied. Examples are thrust, drag, lift, weight, speed and pressure to name a few. When discussing high speed or supersonic flight, compressibility, angles of shockwaves and the Area Rule may be added.

When discussing movement of a vehicle through water there are similar parameters that are applied, static pressure at depth, dynamic pressure before and after an object passes, cavitation, buoyancy, etc.

When a conversation occurs that must take these two mediums into account at the same time such as a planing boat hull, the interface of this vehicle between the air and the water must include aspects of both mediums.

A very similar concept to this conversation would be how a car tire interacts with the road. Tires are designed to be minimally interfacing with the road to reduce friction, but also provide traction at the same time. This interface is a balance between how much area is allowed to be in contact with the road surface (the less the better for friction) and how much traction can be gained by this area (the more the better). This can be further discussed when the tire is subjected to a wet road surface as the compressibility of the tire must be taken into account as the water will not compress and thus needs to be absorbed (tire will take a small amount of deflection), must be displaced (tread patterns and channels in the tire will allow and direct the water away from the impact area), or lastly the water impact area will be too great for either of the above and the result will be hydroplaning, which is almost exactly what happens to a boat hull at speed.

Therefor the concept of the serrated keel takes into account the intent to redefine or minimize the friction of the boat hull in relation to the water surface while at speed (by allowing air to be introduced at the interface between the hull and the water), while also providing channels for either the water to escape or be dampened (accumulator effect) during impacts using the same structures.

The Rule of 3 is preferably to be applied to the teardrop cutouts. This rule would be applied to the frequency of cutouts from a depth and a length perspective—the teardrop should be one third the depth as the length. This would allow a symmetry to be kept along the hull even if the size of the serrations is altered.

The acute angles of the wing shape when viewed from below are preferably to be defined based on shockwave angles of supersonic aircraft. This would seem logical as this would be a natural effect of an object moving at speed with compressibility of a fluid applied to the interface of vehicle and fluid.

3. Building the Design or Implementing the Design into an Existing Hull Mold.

One of the benefits of the design of the apparatus of the present invention is that the serration shape could be a "plug" or a male part applied to the female hull mold as this shape could be molded into the final part. The reverse aspect of this would be that the design which adds the shape to the hull would actually be removing material from the flat hull surface rather than adding a protruding shape to the hull surface. This would be of huge importance to any hull manufacturer as the semi-teardrop shape parts can be simply laid out onto any existing hull mold (and be similarly removed if required). This would preferably require that the shapes be formed out of hard plastic or other easily worked or molded material and simply positioned on the female hull mold. When utilizing the traditional method of hand laying out the fiberglass material, the serrated shapes will preferably be included in the hull design. In other words, any existing hull mold could be modified by adding the serrated shapes in the proper areas to generate the intended design.

In the present invention, a male plug would preferably only be used when molding a hull using a female mold. When building a hull out of wood or metal, the wing shape would preferably be installed as part of the hull.

This design will also serve to strengthen the area between bulkheads and stringers. The "panel" areas would be the flat areas of the hull that are formed when the longitudinal stringers and transverse bulkheads are installed during the building process. The rectangular flat areas are subject to flexural stresses as the hull impacts the water surface during operation. These rectangular areas would be strengthened by adding the serrated shapes to the hull bottom which includes the oblique angles. The added structural length and thickness of each serration half would be advantageous to the overall hull design similar to the way convoluted surfaces are typically stronger than flat surfaces when flexing.

In one embodiment, the height of the teardrop cutout is preferably 1 radius.

Figure 26:
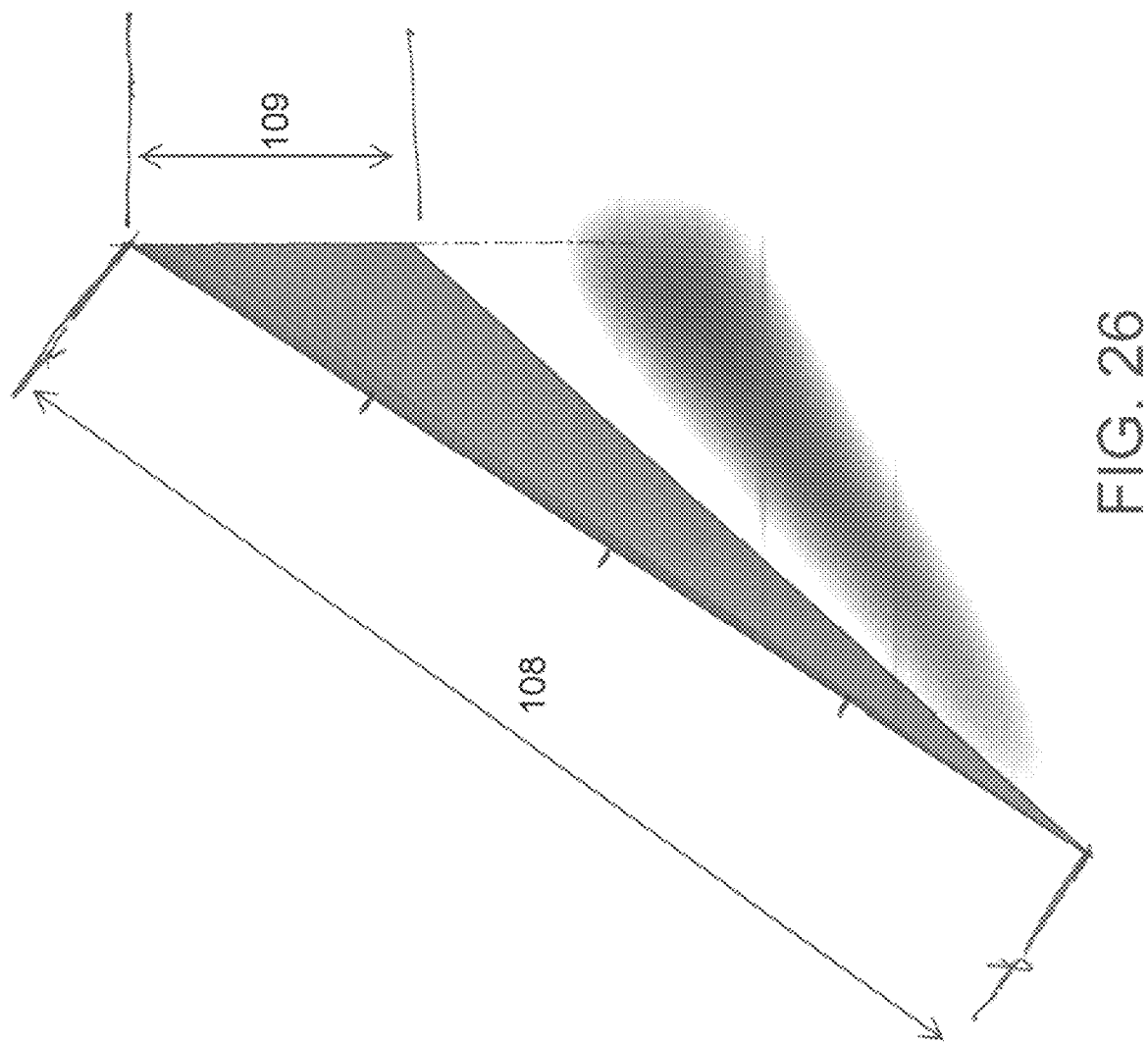
FIGS. 26 and 27 are views of a plug showing relationships of sizes of different parts of the plug.

In one embodiment, as shown in FIG. 26, the center length of the teardrop cutout will preferably be 3 diameters, the longest angle will preferably be 12 diameters. However, the center length can be for example 2-5 diameters and the longest angle can be for example 9-15 diameters.

Figure 27:
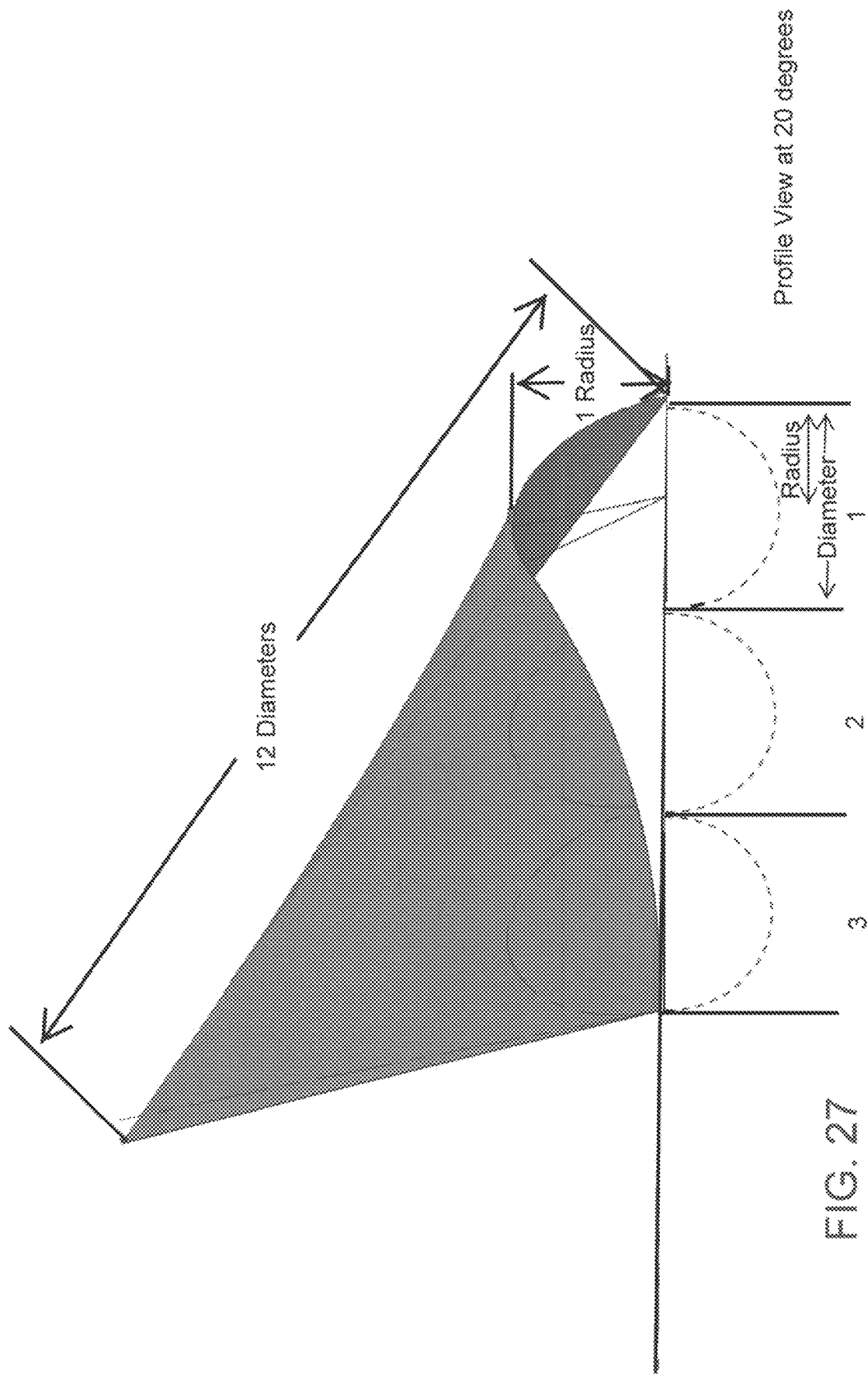

In one embodiment, as shown in FIG. 27, there is preferably a 20 degree rise from horizontal (though it could be for example a 5-75 degree rise). In this position the height of the wing plug will be distended from the original or flat rendering. When viewed from a flat position with no horizontal rise, the shape will preferably be a proper 3:1 ratio with a hemispherical starting point (first diameter) (though it could be for example a 2-5:1 ratio).

As the angle of the wing increases away from horizontal, the height of the shape will preferably also increase as the two halves merge together along the center length. The center length or the wing lengths will preferably not change, only the height of the original radius and the corresponding curve along the entire part will change.

In various embodiments, the "plugs" would be used with conventional fiber reinforced plastic (FRP) construction, such as typical "fiberglass" layup methods. If the hull were made of metal, each half of the wing shape would need to be shaped using metal forming techniques such as rolling or hydraulic die stamping.

In certain embodiments of the present invention, the aft serrations will not cross the lifting strakes.

In certain embodiments of the present invention, the forward serrations may cross the lifting strakes.

In preferred embodiments of the present invention, as the wing plug shape angle decreases to match the V shaped bottom of the hull, the diameter of the teardrop shape will be extended to match. In these embodiments, the wing plug will have a higher angle of attack near the bow where the hull gets sharper.

Figure 5:
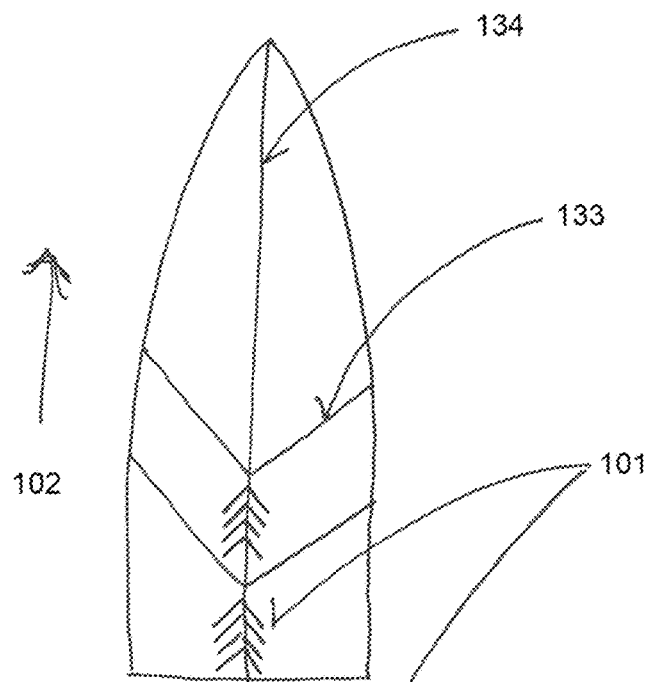
FIG. 5 is a bottom view of a preferred embodiment of the apparatus of the present invention.

A bottom view of a preferred embodiment of the apparatus of the present invention is shown in FIG. 5. As seen in FIG. 5, the boat hull comprises a centerline 134, stepped hull 133, and oblique angle departures on rear half of hull 101. The direction of travel is shown by arrow 102.

Figure 6:
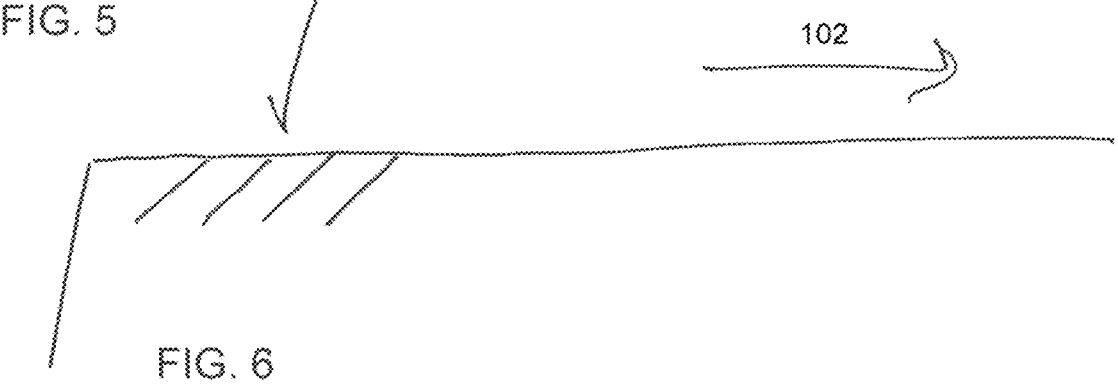
FIG. 6 is partial side view of a preferred embodiment of the apparatus of the present invention displaying oblique angle departures on rear half of hull.

FIG. 6 is partial side view of a preferred embodiment of the apparatus of the present invention displaying oblique angle departures 101 on rear half of hull. The direction of travel is shown by arrow 102.

Figure 7:
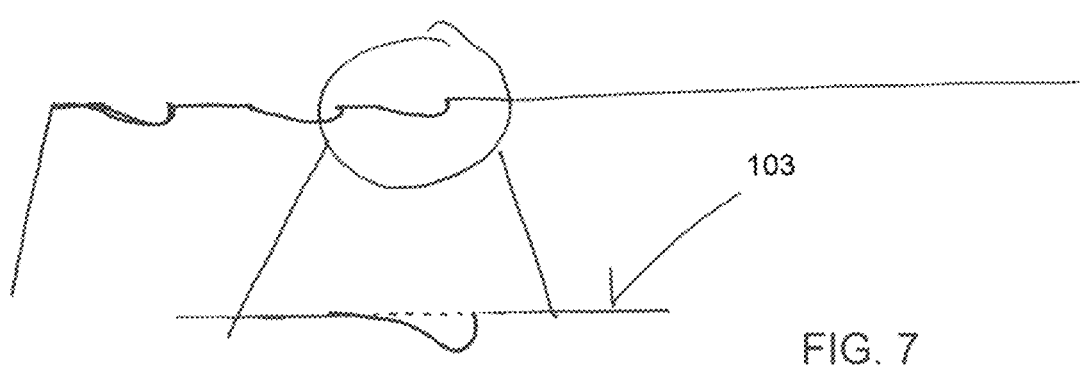
FIG. 7 is a close-up detail of the tear drop cutout of a preferred embodiment of the apparatus of the present invention.
Figure 16:
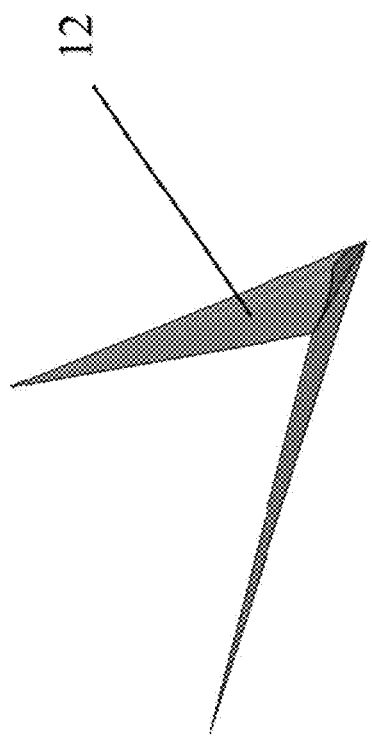
Figure 17:
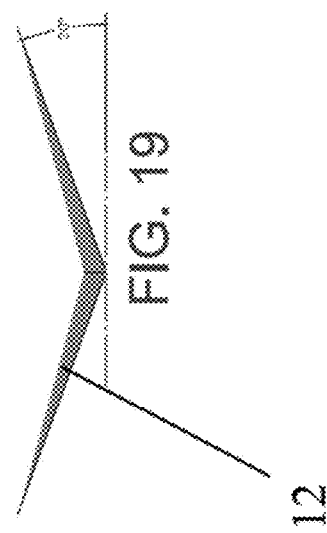
Figure 18:
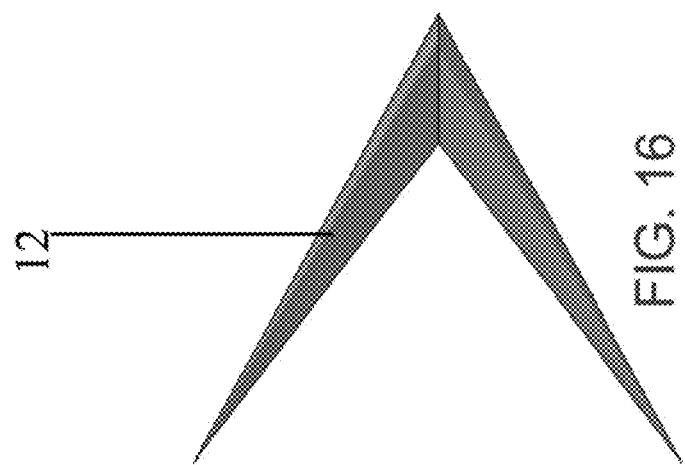
Figure 19:
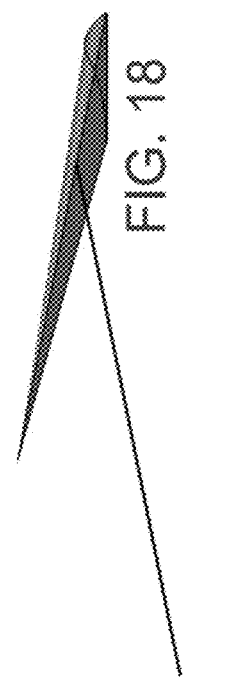
Figure 20:
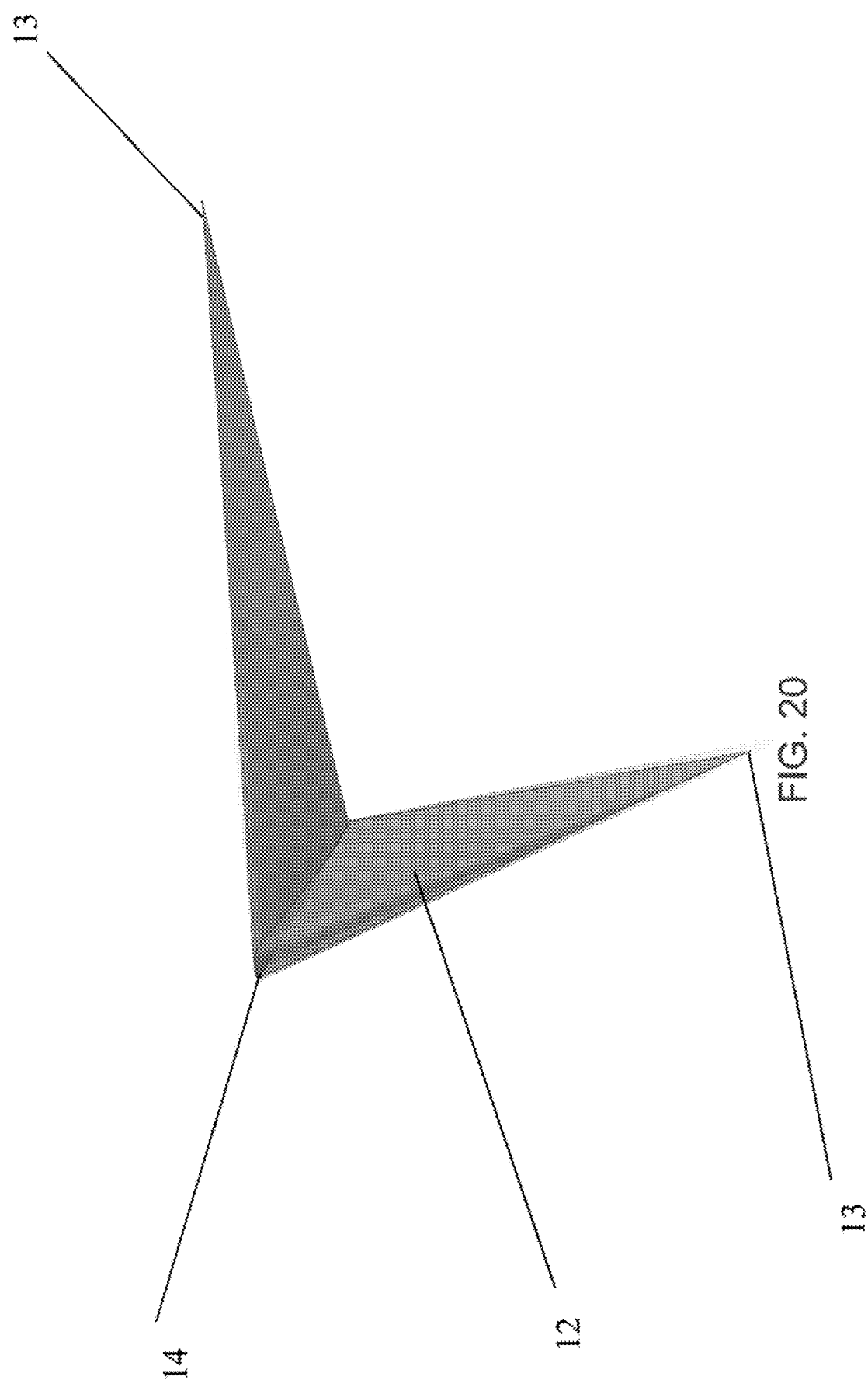

FIG. 7 is a close-up detail of the tear drop cutout 103 of a preferred embodiment of the apparatus of the present invention.

FIG. 8 is a partial side view diagram of a preferred embodiment of the apparatus of the present invention displaying the low-pressure area 106, direction of fluid flow 104, and direction of travel 102. The oblique angle departure 101 from centerline cutout extends from the centerline of the hull 105.

FIG. 9 is a partial view of the hull 105 bottom of a preferred embodiment of the apparatus of the present invention. As seen in FIG. 9, the departures 107 can be at a shallower angle than hull 105 bottom so that they only extend half the distance to outside of the hull.

FIG. 10 is partial side view of a preferred embodiment of the apparatus of the present invention displaying a close-up of a serrated hull 105 located in rear of hull. As seen in FIG. 10, each serration provides a low pressure area 106. Fluid flow is designated by arrow 104 and direction of travel by arrow 102 in FIG. 10.

FIGS. 11-20 show plugs to be used in molds to produce hulls with serrations. Each plug 12 comprises a base point 14 and two apexes 13.

Figure 21:
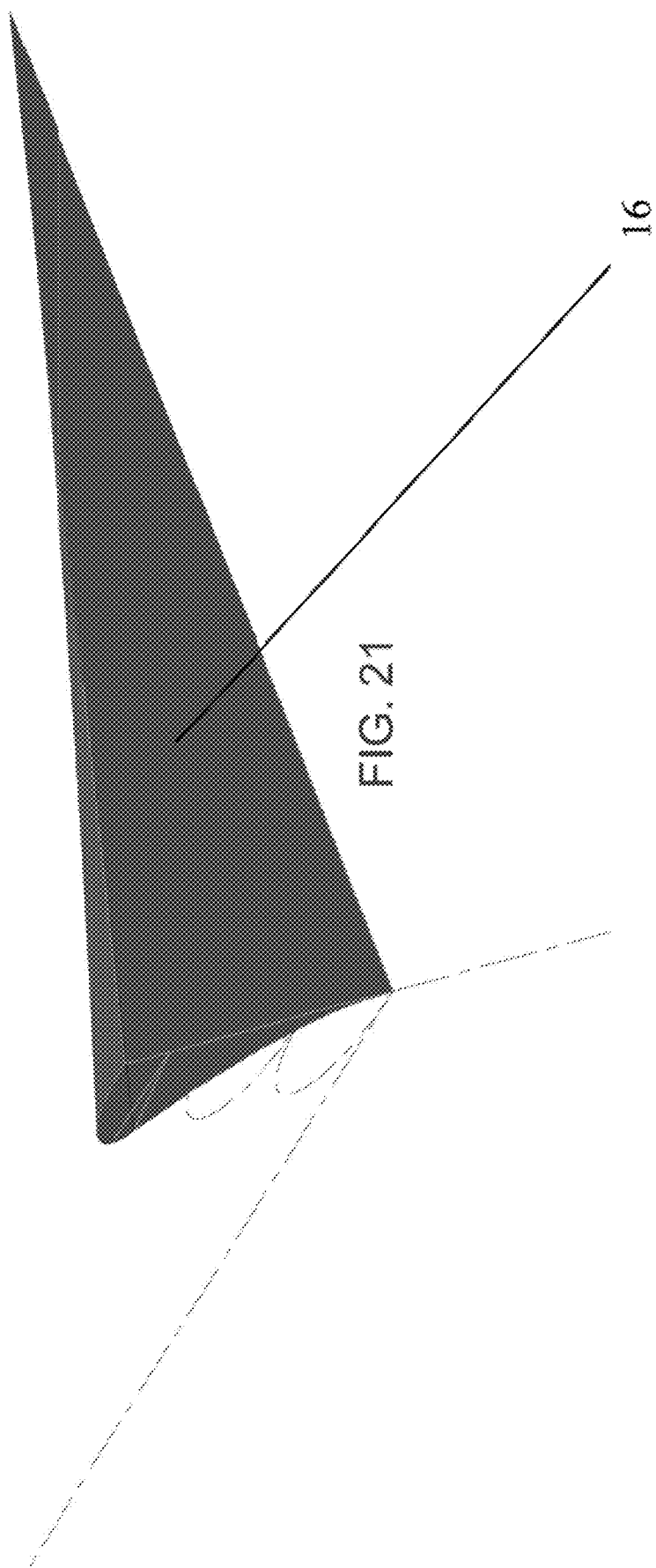
FIGS. 21-22 show partial views of the plugs to be used in molds to produce hulls with serrations.
Figure 22:
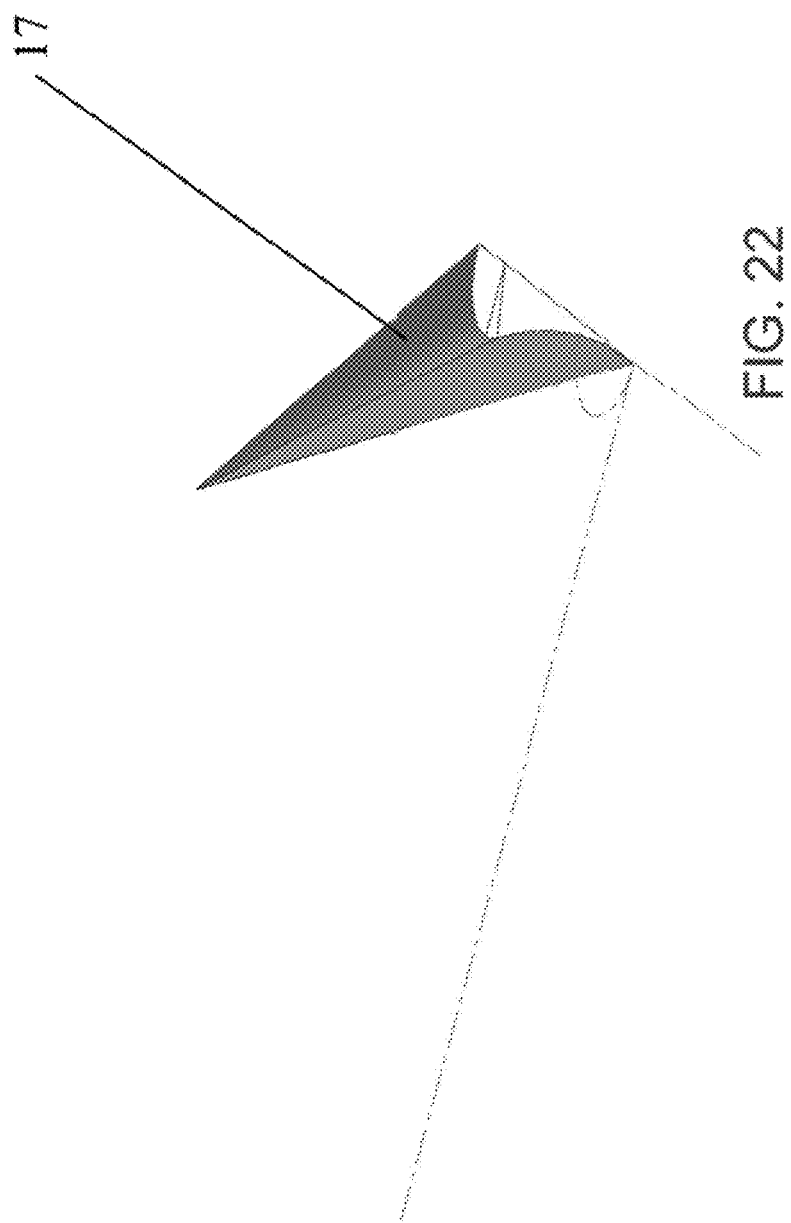

FIGS. 21-22 show partial views of the plugs to be used in molds to produce hulls with serrations. FIG. 21 shows the flat surface 16 of wing plug 12 (attaches to boat hull mold) and FIG. 22 shows curved portion 17 of wing plug 12.

Figure 23:
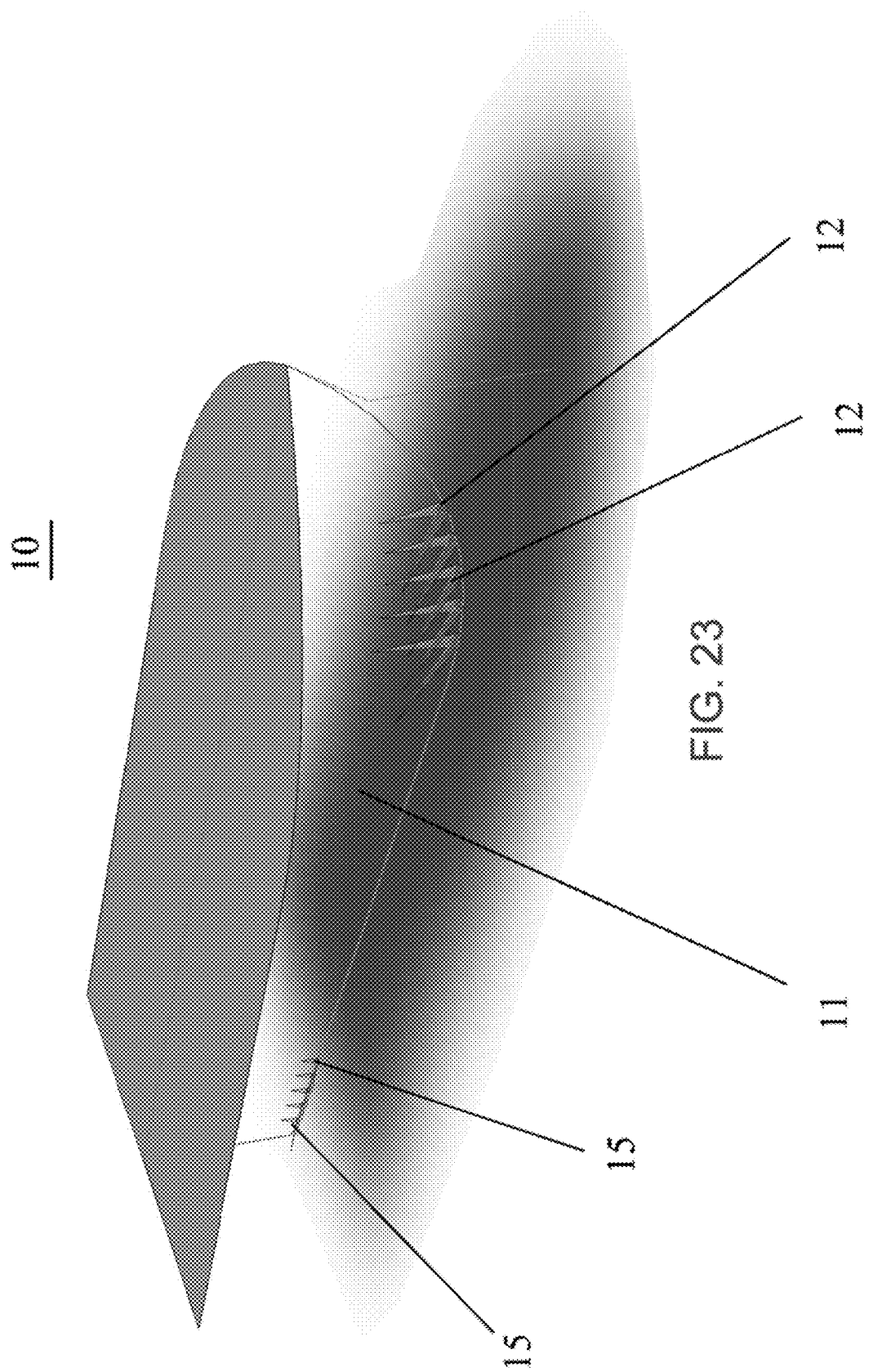
FIGS. 23-25 show a boat hull with the serrations produced by the plugs of FIGS. 11-22.
Figure 24:
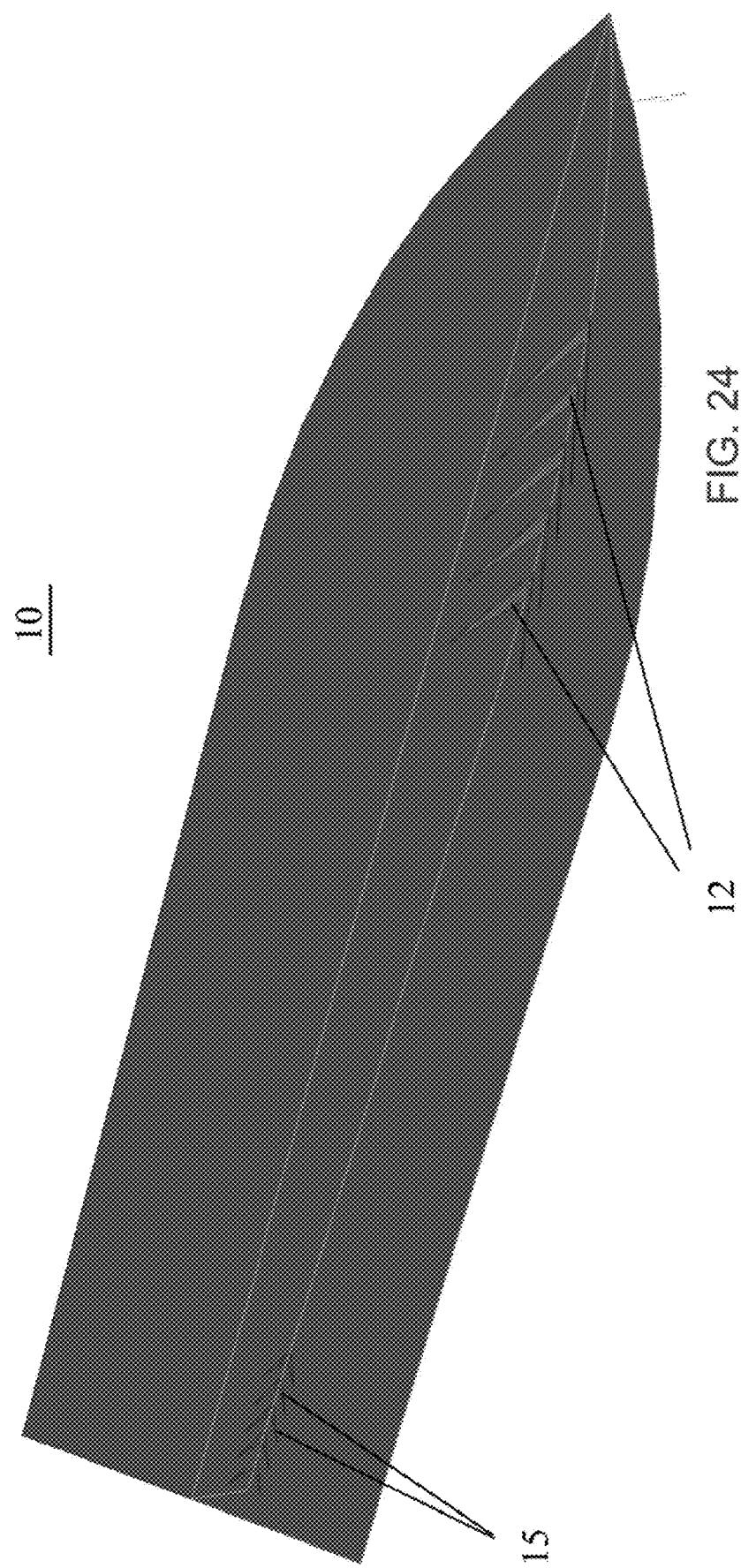
Figure 25:
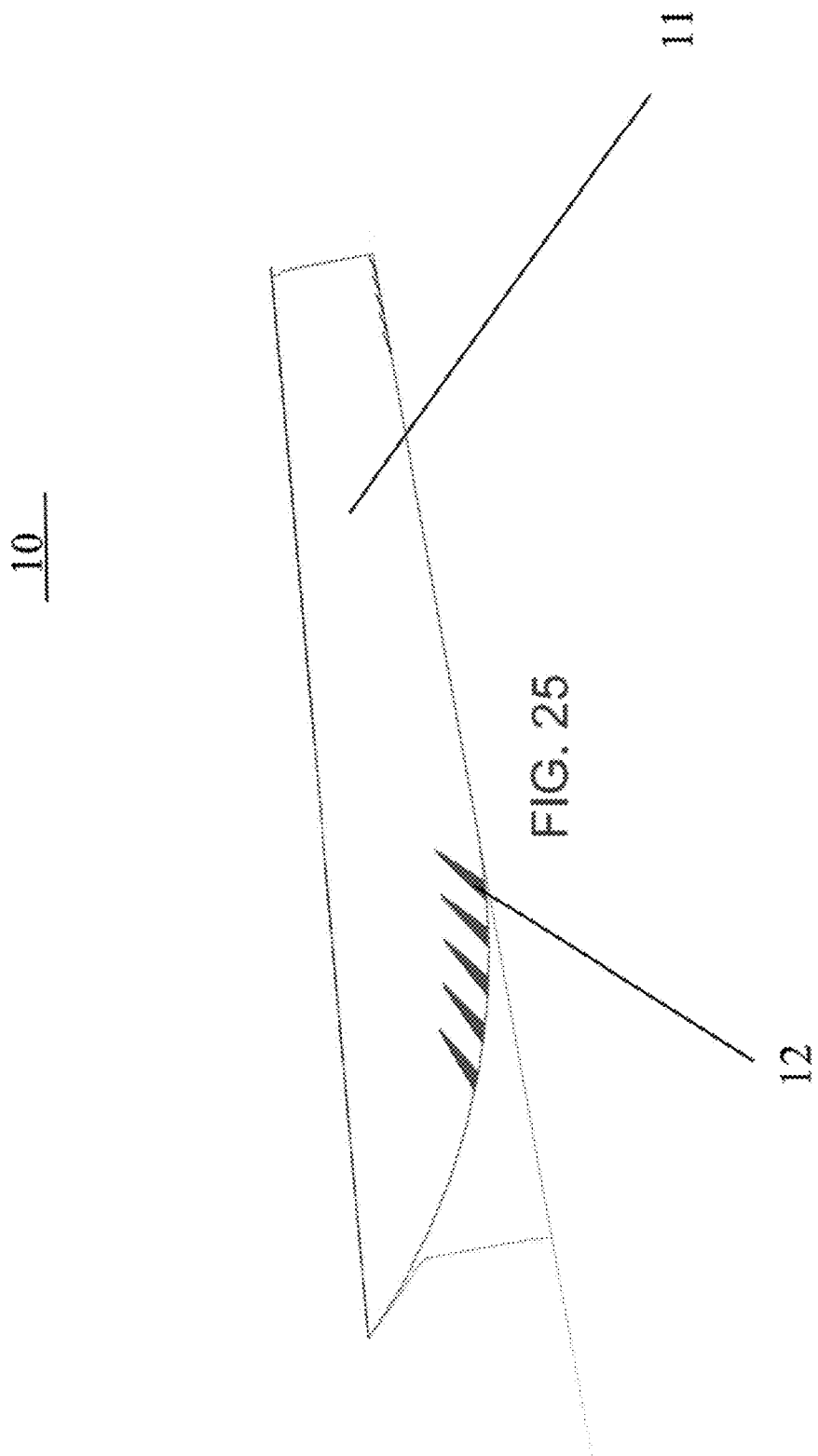

FIGS. 23-25 show a boat hull 10 with the serrations produced by the plugs of FIGS. 11-22. As seen in FIGS. 23 and 24, there can be smaller wing plugs 15 used on the aft portion of the hull and larger wing plugs 12 used on the forward portion of the hull.

FIGS. 26 and 27 are views of a plug showing relationships of sizes of different parts of the plug. As seen in FIG. 26, in an embodiment the center length of the teardrop cutout 109 will preferably be 3 diameters and the longest angle of teardrop cutout 108 will preferably be 12 diameters. As seen in FIG. 27, in one embodiment, there is preferably a 20 degree rise from horizontal. In this position the height of the wing plug will be distended from the original or flat rendering. When viewed from a flat position with no horizontal rise, the shape will preferably be a proper 3:1 ratio with a hemispherical starting point (first diameter).

PARTS LIST

The following is a list of parts and materials suitable for use in the present invention:
Parts Number Description
10 boat hull apparatus
11 boat hull mold
12 larger wing plug
13 apex of wing plug 12
14 base point of wing plug 12
15 smaller wing plug (preferably same proportions as wing plug 12, just smaller)
16 flat surface of wing plug 12 (attaches to boat hull mold)
17 curved portion of wing plug 12
20 serration produced by smaller wing plug on aft hull section
21 serration produced by smaller wing plug on aft hull section
22 serration produced by smaller wing plug on aft hull section
23 serration produced by smaller wing plug on aft hull section
24 serration produced by smaller wing plug on aft hull section
25 serration produced by smaller wing plug on aft hull section
26 serration produced by smaller wing plug on aft hull section
27 serration produced by larger wing plug on forward hull section
28 serration produced by larger wing plug on forward hull section
29 serration produced by larger wing plug on forward hull section
30 serration produced by larger wing plug on forward hull section
31 serration produced by larger wing plug on forward hull section
32 aft hull step
33 forward hull step
34 centerline or keel of boat hull
40 transom
41 starboard stern section of hull
42 starboard bow section of hull
43 port stern section of hull
44 port bow section of hull
50 stern section of hull flat panel area between lifting strakes
60 starboard chine
61 starboard outer lifting strake
62 starboard inner lifting strake
101 oblique angle departure
102 direction of travel
103 tear drop cutout
104 fluid flow direction
105 hull
106 low pressure area
107 departures
108 longest angle of teardrop cutout
109 center length of teardrop cutout
133 forward hull step
134 centerline or keel of boat hull All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A boat hull including a serrated keel, wherein the serrated keel comprises at least two serrations, said serrations having a depth which is less than a length of the serration, said serrations being generally V-shaped when viewed from below the hull, wherein each serration has a starboard portion and a port portion, a fore end and an aft end, said starboard and port portions meeting at a centerline of the hull and each extending from the centerline of the hull rearwardly and away from the centerline of the hull.

2. The hull of claim 1, wherein the serrations are limited to the aft parts of the keel.

3. The hull of claim 1, wherein the serrations are limited to the forward parts of the keel.

4. The hull of claim 1 wherein the hull further comprises lifting strakes.

5. The hull of claim 4 wherein the serrations comprise aft serrations and the aft serrations do not cross the lifting strakes.

6. The hull of claim 4 wherein the serrations comprise forward serrations and the forward serrations cross the lifting strakes.

7. The hull of claim 4, wherein the serrations have a depth which is one third their length.

8. The hull of claim 1 wherein the serrations are made using plugs.

9. The hull of claim 1 wherein the serrations are teardrop shaped and wherein the hull has a bottom which is V shaped, wherein the serration has an angle which decreases to match the V shaped bottom of the hull and a teardrop shape which has a diameter which is extended to match said decrease of the angle.

10. The hull of claim 1, wherein the depth is one third of the length.

11. A boat hull comprising a serrated keel, at least two lifting strakes, a starboard chine, a port chine, and at least one hull step,
wherein the serrated keel comprises at least two serrations, said serrations having a depth which is less than a length of the serration, each serration comprising two teardrop shaped cutouts which meet at a centerline of the hull, each teardrop cutout departing from the centerline of the hull at an oblique angle towards an aft portion of the hull;
wherein the serrations comprise aft hull serrations;
wherein said aft hull serrations do not cross the at least two lifting strakes; and
wherein the at least one hull step crosses the at least two lifting strakes and extends from the starboard chine to the port chine.

12. The boat hull of claim 11 wherein the serrations comprise forward hull serrations and wherein the forward hull serrations cross the lifting strakes.

13. The boat hull of claim 12 wherein the forward hull serrations decrease in size from aft to forward as the bow gets narrower.

* * * * *